Nov. 28, 1961
J. B. SNELL
3,010,210
APPARATUS AND METHOD FOR STUDYING EARTH PROFILE
BY MEANS OF TOPOGRAPHIC MAPS
Filed Nov. 5, 1957
2 Sheets-Sheet 1
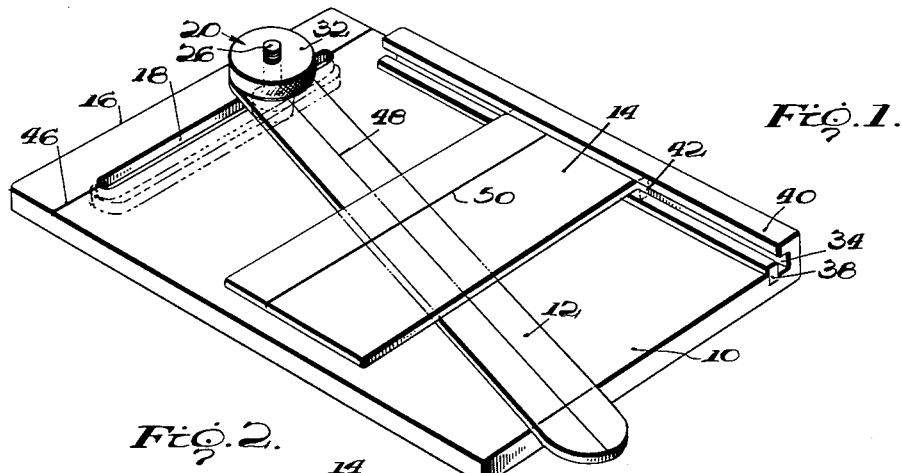
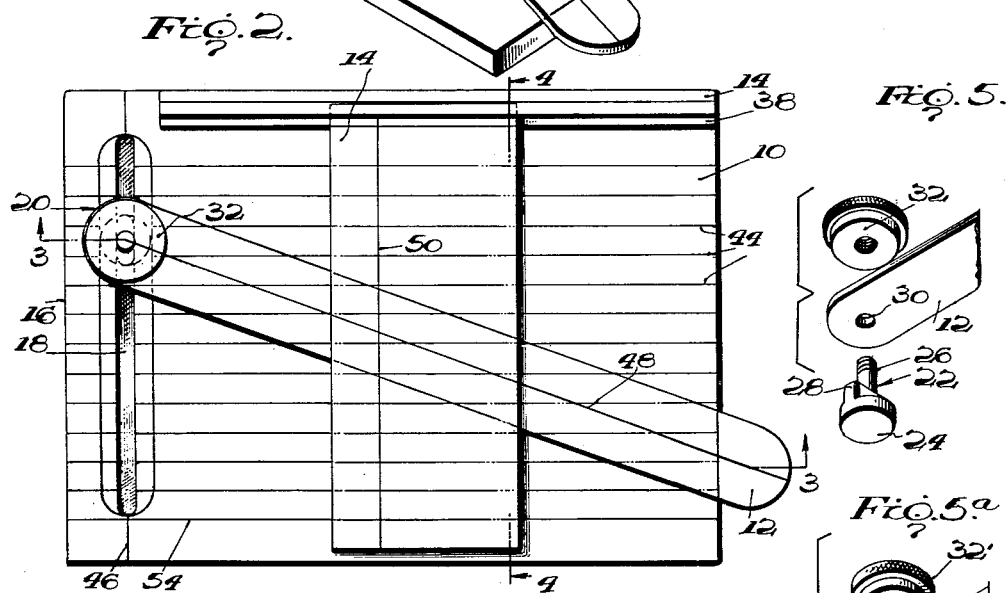
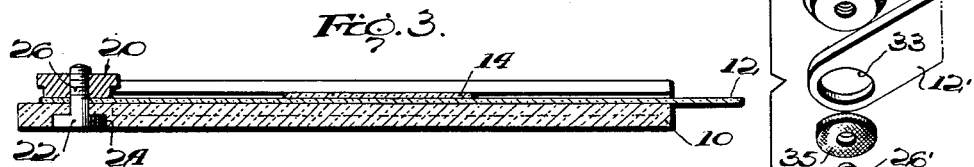
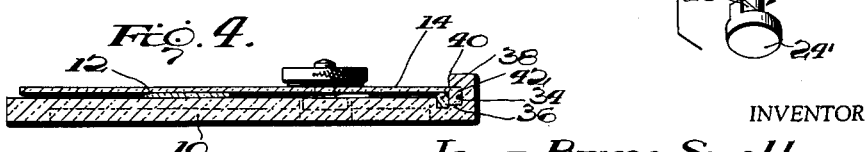
INVENTOR
Joan Bruce Snell.
BY *W. J. Eccleston*
ATTORNEY Nov. 28, 1961  J. B. SNELL  3,010,210
APPARATUS AND METHOD FOR STUDYING EARTH PROFILE
BY MEANS OF TOPOGRAPHIC MAPS
Filed Nov. 5, 1957  2 Sheets-Sheet 2

INVENTOR
Joan Bruce Snell.
BY
W. J. Eccleston.
ATTORNEY

United States Patent Office 3,010,210
Patented Nov. 28, 1961

3,010,210
APPARATUS AND METHOD FOR STUDYING EARTH PROFILE BY MEANS OF TOPOGRAPHIC MAPS
Joan Bruce Snell, Natick, Mass.
Filed Nov. 5, 1957, Ser. No. 694,686
3 Claims. (Cl. 33—97)
(Granted under Title 35, U.S. Code (1952), sec. 266)

The invention described herein, if patented, may be manufactured and used by or for the Government for governmental purposes, without the payment to me of any royalty thereon.

The present invention relates to map study devices and methods and more particularly to a device and a method for making earth and strata profiles studies (either surface, supersurface, or subsurface) by means of topographic, tectonic, or structural contour maps of any scale and any contour interval.

There are many occasions or purposes for which it becomes desirable quickly to determine the angle of a line simulating the line of sight between two spaced points represented on a map and the elevation of points on the surface illustrated by said map, either between or beyond these two spaced points, in relation to the line of sight determined by those points.

For example, it may be necessary to know whether a specific spot on the surface between the two spaced points intercepts this line of sight for such diverse purposes as military operations or in the television industry. This information may be vital in military operations to determine whether or not one point or area on the terrain can be kept under visual observation from a second point. It may be useful in the television industry because it will show, for example, the transmitting range of a station located at a particular point and thus areas that will interfere with transmission from that location. It may be useful in the mining industry because it will indicate the direction and angle a tunnel must be cut in order to follow a lode.

Heretofore, determinations similar to those above mentioned were normally made by graphically constructing a profile of the surface between the two points in question. While the results obtained by that method may have been satisfactory, the method had the disadvantage of being time-consuming. The present invention is concerned with an apparatus and a method for quickly obtaining the same information which might be obtained from the conventionally made graphic profile of the surface between two spaced points. Both apparatus and method are general in scope, not limited to any map scale or contour interval.

Accordingly, it is an object of the invention to provide a new and improved apparatus and method for studying earth and strata profiles which eliminates the need for graphically constructing these profiles to carry out those studies.

Another object of the invention is to provide a new and improved apparatus and method for determining by means of a contour map (either topographic or stratigraphic), points between or beyond two spaced points which will intercept the line of sight between or beyond these points.

A further object of the invention is to provide a new and improved apparatus and method for establishing a line of reference or datum line on a contour map to simulate the line of sight between spaced points.

A further object of the invention is to provide a new and improved apparatus and method for quickly determining by means of a contour map the elevation of any object between or beyond any two spaced points relative to the line of sight determined by those points.

A still further object of the invention is to provide a new and improved apparatus and method whereby line of sight as established by two spaced points on a map enables the determination of the shadowed areas along and below the line of sight produced by any objects that intercept the line of sight and, through the use of such information, enables determination of the following characteristics of an area either above or below the surface of the earth:

(1) Whether a position on a topographic or stratigraphic map is in the shadow of an object at any elevation in regard to a line of sight originating from a particular point.

(2) The shadowed area of any one object at a particular elevation in regard to lines of sight originating from a particular point.

(3) The total shadowed area within an area cast by various elevations by line of sight from an origin, thus determining the position where greatest (or least) coverage of the area can be obtained.

(4) The interference afforded by surrounding objects to a particular position from lines of sight emanating from various origins.

(5) The interference afforded by the various elevations within an area to various positions within this area from lines of sight emanating from various origins, thus determining the most (or least) protected position of the area.

A more general object of the invention is to provide an apparatus as set forth in the foregoing objects which is exceedingly simple in construction and can be made from commonly available materials so that it is inexpensive, and which requires little training to operate, but which, nevertheless, produces accurate determinations of surface conditions. These and other objects, advantages, and capabilities of the invention will become apparent from the following description wherein reference is had to the accompanying drawings in which:

FIG. 1 is a perspective view of the improved device of the present invention;

FIG. 2 is a top plan view of this device;

FIG. 3 is a vertical sectional view of the device taken on the line 3—3 of FIG. 2;

FIG. 4 is a vertical sectional view on the line 4—4 of FIG. 2;

FIG. 5 is an exploded perspective view of one part of the device of the present invention;

FIG. 5a is a view similar to FIG. 5 of a modification of the structure shown in FIG. 5;

Figure 6:
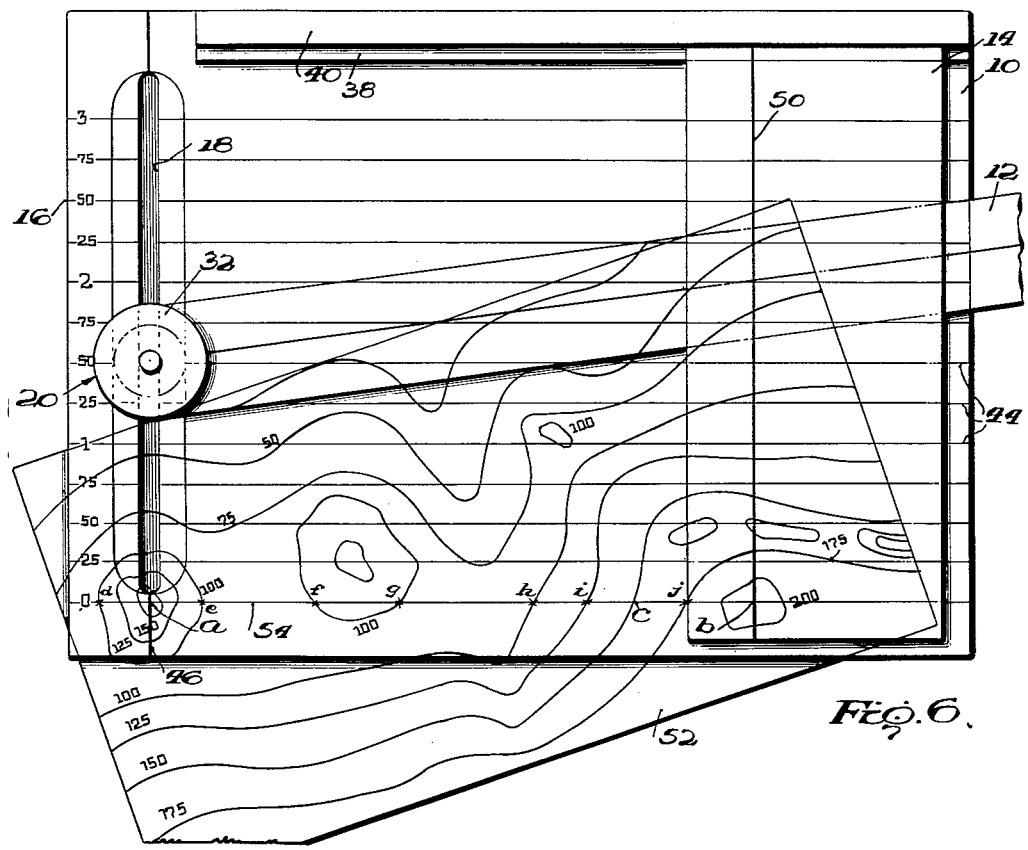
FIG. 6 is a top plan view of the device of the present invention and a topographic map illustrating the use of this device.

Referring to FIGS. 1 and 2, the device of the present invention comprises a base 10 and first and second elongated movable members 12 and 14, respectively, all of which may be made from any suitable rigid transparent material. The base 10, which is of generally rectangular shape, may be of any suitable dimensions, and should have a smooth flat top and bottom side. Adjacent one of its side edges 16, the base is provided with a shouldered, straight, slot 18, which extends over the major portion of the distance from the bottom to the top edge of the base generally parallel to the side 16. This slot forms a slideway for a mounting pintle or connecting member 20 for slidably and pivotably mounting the first elongated movable member 12 upon the base 10. The pintle or connecting member 20 may comprise a screw 22 having a head 24 and a shank 26.

The head 24 is dimensioned to be received in the wider portion of the slot 18 which is located in the underside of the base as seen in FIG. 3, while the shank 26 is slidably receivable in the narrow portion of the slideway 18, and projects outwardly of the topside of the base. To lock the connecting member 20 against turning in the slideway 18, the shank 26 is provided with lugs or shoulders 28 (FIG.

5) slidably receivable in the narrow portion of this slideway.

The first elongated movable member 12 has an aperture 30 adjacent one end thereof, which loosely fits the cylindrical upper end of shank 26 of the pintle so that this member may pivot freely upon the shank. The first elongated movable member 12 is locked at any desired position upon the base by means of a nut 32 which may be threaded on the upper end of the shank 26. When it is tightened, the head 24 of the pintle or connecting member 20 is drawn against the shoulder in slideway 18, and the first elongated movable member 12 is pressed against the topside of base 10, so that this member is locked against both pivotal movement of the connecting member 20 and sliding movement lengthwise of the slideway 18.

Improved mounting structure for the first elongated member 12 is disclosed in FIG. 5a in which the parts which are duplicates of parts shown in FIG. 5 have been given the same number primed. As there indicated, the improved pintle or connecting member comprises a screw 22' having a head 24' and a shank 26' with a lug or shoulder 28' to engage in the narrow portion of slideway 18 and prevent turning of the screw, while a nut 32' may be threaded on the outer end of shank 26' to lock and release the connecting member 20. In this form of the invention, the first elongated member 12' has an enlarged aperture 33 for frictionally receiving a washer 35 having an aperture loosely receivable upon the shank 26'. As will be obvious, the screw connection or pintle 22', may be locked in position in the slot 18 by tightening the nut 32', and this will also lock the washer 35 against turning. The elongated member 12' will likewise be locked against free pivotal movement on the pintle 22', but by virtue of its frictional connection with washer 35, it may be pivotably adjusted on this washer by the application of force sufficient to overcome the frictional restraint.

It should be noted that this mounting of the first elongated movable member holds it in flat contacting engagement with the topside of the base 10 and that it is long enough to sweep the entire top surface area of the base, irrespective of the position at which the pintle or connecting member 20 is located along the slideway 18.

A second elongated, straight, slot or groove 34 is provided in the topside of the base 10 on an axis perpendicular to the axis of slideway 18, and preferably adjacent the upper edge of the base to form a slideway for mounting the second elongated movable member 14 on the base 10 and guiding its movement relative thereto. This slideway is formed by a recess 36 in the base 10 of variable depth, and a sliderail 38 seated in the deeper portion of the recess 36 in the base as shown in FIGS. 1 and 4, the sliderail 38 projecting outwardly of the top surface of the base a distance corresponding substantially to the thickness of the first elongated movable member 12 for a purpose to be described. The slideway 34 is partially closed by an overhanging flange 40 on the upper edge of the base 10.

The second elongated movable member 14 has a head 42 fixed on one end thereof normal to the longitudinal axis thereof. This head is slidably receivable in the slideway 34 and is held against escape from this slideway, except in an endwise direction, by the overhanging flange 40. By virtue of this construction, the second elongated movable member 14 is freely slidable longitudinally to the base 10 upon the sliderail 38 and the topside of the first movable member 12, and is maintained in parallel relationship to the axis of slideway 18.

Inscribed upon or otherwise suitably formed in the flat top surface of the base is a grid consisting of a plurality of uniformly spaced parallel lines 44 disposed in parallel relation to the longitudinal slideway 34 and perpendicular to the axis of the transverse slot or slideway 18. A line 46 is also formed in the base 10 in continuation of the longitudinal axis of slideway 18 so that this line and the axis of the slideway form a first line of reference or datum line with respect to the parallel lines 44. The first elongated movable member 12 has a line 48 suitably superposed, inscribed, or otherwise formed thereon, such that the center of aperture 30 lies on the continuation of this line, and the second elongated movable member 14 also has a straight line 50 extending longitudinally thereof upon an axis parallel to the axis of transverse slideway 18, and perpendicular to the parallel lines 44 at all positions of slidable adjustment of the second elongated movable member. The parallel lines 44, the perpendicular line 46 on the base and the lines 48 and 50 on the movable members 12 and 14, respectively, cooperate in a manner which will now be described when the device of the present invention is used to study earth or strata profiles.

Assume that, for the surface under investigation, the profile represented by the line determined by any two particular spaced points on a contour map of this surface is to be studied. For example, it may be desirable to ascertain whether or not any point of land lying between a television tower and a receiving station would intercept the line of sight of broadcast waves and interfere with reception. In that case, a contour map of the area containing the tower and receiving station is to be used, and the two spaced points on this map will be the points representing the television tower and receiving station respectively. The method described below will establish an imaginary profile of the earth's surface between and beyond these two points, and an imaginary line of sight between the tower and receiving station.

The contour map to be used may be laid on a flat surface, and the two spaced points may be marked for identification. If desired, a line may be drawn connecting these two points which have been indicated as *a* and *b* on FIG. 6. Selecting one of the parallel lines 44 on the base plate 10, such as bottom line 54, for example, as a base line, numerical values are assigned to the parallel lines to form a scale representing height above or below sea level. If desired, these values may be marked on base plate 10, as indicated on the left in FIG. 6, either before or after the base 10 and map 52 are brought into the superposed relation shown in FIG. 6. As indicated in FIG. 6, the point of intersection of the base line 54 and the transverse line 46 making the axis of slideway 18 should be superposed relative to the point *a* on the map, and the may and base plate so shifted relative to each other that the base line 54 passes over point *b*. The two parts should be fixedly held in this position in any suitable manner during the performance of the rest of the steps in the improved method described hereinafter.

By slidably moving the pintle or connecting member 20 in the proper direction along the slideway 18, the axis thereof should be brought to a position corresponding to the elevation represented by the point *a* (i.e. the elevation of the receiving station), as shown on map 52, using the scale formed by the parallel lines 44 (as described above) to measure off this distance. The first elongated movable member 12 should then be locked against sliding movement lengthwise of the slideway 18 by tightening nut 32. With the connecting pintle member 20 thus locked in position, the second elongated movable member 14 is moved in slideway 34 in the proper direction to bring the datum line 50 on the same into alignment with the point *b*, so that this datum line forms a perpendicular to the base line 54 at the point *b*. While the second elongated movable member 14 is held at the position of adjustment above described, the first movable elongated member 12 is then swung on pintle or connecting member 20 until the datum line or line of references 48 on this first member is brought to the point where it intersects the datum line or line of reference 50 on the second elongated movable member 14 at a position on this latter line corresponding to the elevation represented by the point *b* (i.e. the elevation of the television tower) as measured off on the scale formed by the parallel lines 44. At this position of the first elongated member, the datum line 48 thereon represents the simulated line of sight between the tower and the station.

Figure 7:
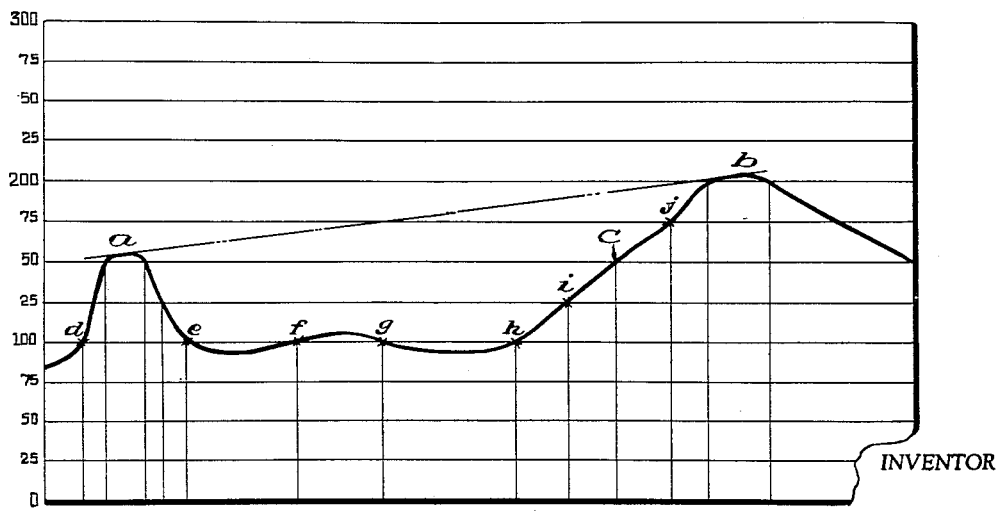
FIG. 7 is a view of a simple earth profile made by using the improved device and method of the present invention.

This will become apparent from a comparison of the line of sight shown in FIG. 7, which shows a graphical reproduction of the earth profile between the tower and receiving station represented by points *a* and *b* on map 52 with the simulated line of sight which the datum line 48 represents in FIG. 6.

If now it is desired to determine whether or not any portion of the terrain between points *a* and *b*, such as the point represented by *c*, for example, intercepts this line of sight, the first elongated member 12 is maintained in this final position of adjustment, while the second elongated member 14 is moved in the slideway 34 to the point at which the datum line 50 thereon overlies the point *c*. The datum line 50 thereon then represents a perpendicular to the base line 54 at this point, and the elevation shown on the map 52 for the point represented by *c* (150 feet) is then measured off along this perpendicular, using the scale formed by the parallel lines 44. Whether or not the point represented by *c* is high enough to intercept the line of sight will thus be readily apparent.

If desired, a profile of the terrain between the points represented by *a* and *b* can be quickly laid out on the base 10 by repeating this process at a plurality of points *d* through *j* along the base line 54, and marking the elevation of each of these separate points on the base 10 by means of an *x* such as shown in FIG. 7, or by other suitable means. These separate points can then be connected by a line to form a complete profile as shown in FIG. 7.

It is to be understood that, for the purpose of illustration, a simplified example has been used to explain the operation of the improved apparatus of the present invention and the practice of the improved method of studying earth or strata profiles. It is also be understood that the apparatus may be used for purposes other than the specific examples set forth herein. For example, in military operations it may be used, not only to determine areas that can be visually observed from a particular elevation, but also in some instances to determine areas of defilade and enfilade and related operation, such as positioning of troops and supplies in an area to receive the maximum protection the terrain affords against thermal radiation.

In the field of communications, this device could be used to determine suitable locations for very high frequency and ultrahigh frequency transmitter and receiver towers, since line of sight transmission is required for operating at frequencies above 30 mc. This will include television, frequency modulation broadcasting and microwave relay stations. For portable V.H.F. and U.H.F. transmitters, the device will indicate those areas where they could be most favorably used.

For meteorolical and climatological problems requiring precise knowledge of illumination, the device will be advantageous. Studies involving solar radiation, evaporation and precipitation could also be made with this device.

It is to be understood that various modifications could be made in the construction of the device herein disclosed. For example, the virtually extending slideway 18 could be located midway between the opposite sides of the base 10 and the first elongated movable member 12 pivoted at a point midway between its ends, so that earth profile studies could be made from maps located on both sides of a centrally located transverse slideway. Mechanism other than the specific slideways and connecting members herein disclosed also might be used to mount both the first and second elongated movable members for sliding movement relative to the base 10, including means to mount the first elongated movable member for pivotal movement. Circumstances might also make it desirable to designate as a base line one of the lines in the grid other than the bottom line in the series of parallel lines 44, and the datum line or line of reference on the second elongated movable member 14, for example, could be one of the longitudinal edges thereof. Since the sole function of the two movable member of the device is to bear and move their respective datum lines or lines of reference in the manner heretofore described, they could be replaced, if so desired, by two wires or strings, mounted in a suitable manner to allow the proper movements while being kept taut. Modifications of the type above described and others of similar character clearly fall within the scope of the present invention, because any mechanical arrangement including a fixed datum line, a second datum line movable toward and from the first in parallel relation thereto, means to form a scale for measuring along those lines, and a line to simulate a line of sight are all that are required to carry out the invention.

While a preferred embodiment of the invention has been shown and described it will be apparent that variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

I claim:

1. In a device for making earth strata profile studies on structural contour maps a base including a transparent surface area having a plurality of transversely extending parallel lines formed thereon and a pair of slideways, one of said slideways being perpendicular to said parallel lines and being of stepped formation in transverse section to provide a portion of greater width in the underside of said base than the portion thereof extending through the topside of said base so as to form at least one intermediate shoulder, and the other of said slideways being substantially coextensive with and parallel to said parallel lines, a slide including an elongated transparent member having a datum line formed thereon to extend longitudinally thereof and a head slidable in the slideway parallel to said parallel lines, said head and the said slideway cooperating to maintain the slide at a position at which the datum line thereon is perpendicular to said parallel lines throughout the range of sliding movement of said slide, a pintle slidable longitudinally of the shouldered slideway including a head to engage the shoulder in the said slideway and a lug for engaging in the other portion of said slideway to guide longitudinal sliding movement of said pintle and lock the same against turning movement; an elongated transparent arm pivotably mounted on said pintle, said arm having a datum line formed thereon to extend longitudinally thereof, and manually manipulatable means cooperable with said pintle to draw the head thereof against the shoulder in said shouldered slideway and to press the said elongated arm against the topside of said base with sufficient force releasably to lock the pintle against sliding movement and the arm against pivotal movement; said arm being of sufficient length to sweep the entire lined area of said base irrespective of the position at which said pintle is positioned along its axis of sliding movement.

2. A device as defined in claim 1 wherein the slideway perpendicular to said parallel lines is located closely adjacent to one side of said base.

3. In a device for making earth strata profile studies on structural contour maps a base including a transparent surface area having a plurality of transversely extending parallel lines formed thereon and a pair of slideways, one of said slideways being perpendicular to said parallel lines, and the other being substantially coextensive with and parallel to said parallel lines, a slide including an elongated transparent member having a datum line formed thereon to extend longitudinally thereof and a head slidable in the slideway parallel to said parallel lines, said head and the said slideway cooperating to maintain the slide at a position at which the datum line thereon is perpendicular to said parallel lines throughout the range of sliding movement of said slide, a pintle slidable longitudinally of the other of said slideways and including a head to engage the underside of the said slideway and a threaded upwardly projecting shank, an elongated transparent arm, said arm having a datum line formed thereon to extend longitudinally thereof, means to mount said arm on the shank of said pintle and a nut threadable upon said pintle for fixedly but releasably clamping said arm mounting means against the topside of the slideway in which said pintle is slidable and the head of said pintle against the underside of said slideway releasably to lock the said arm and pintle at a desired position of adjustment along the said slideway, said arm mounting means including a friction washer clamped against the topside of the said slideway by said nut as aforesaid and upon which said arm is frictionally journalled so that the said arm may be pivotably rocked by the application of a predetermined force thereto when the pintle and friction washer are locked against turning and sliding movement.

References Cited in the file of this patent

UNITED STATES PATENTS

| | | |
|---|---|---|
| 1,679,927 | Bell et al. | Aug. 7, 1928 |
| 2,231,906 | Hansen | Feb. 18, 1941 |
| 2,504,532 | Kahan | Apr. 18, 1950 |
| 2,520,904 | Boehm | Sept. 5, 1950 |
| 2,605,960 | Lores | Aug. 5, 1952 |
| 2,656,609 | Siggson | Oct. 27, 1953 |

FOREIGN PATENTS

| | | |
|---|---|---|
| 383,822 | Germany | Oct. 18, 1923 |

OTHER REFERENCES

Military Topography and Photography, F. D. Carlock, George Barta Publishing Company, Menssha, Wisconsin, 1918, pp. 34, 35 and 36. (Copy in Scientific Library U.S. Patent Office.)